Dec. 10, 1929.     H. N. RICHARDS     1,739,090
COMBINED TROLLEY FEEDER CLAMP

Filed May 11, 1927

WITNESSES:
R. S. Williams
Birney Hines

INVENTOR
Howard N. Richards
BY
Wesley G. Carr
ATTORNEY

Patented Dec. 10, 1929

1,739,090

UNITED STATES PATENT OFFICE

HOWARD N. RICHARDS, OF PITTSBURGH, PENNSYLVANIA, ASSIGNOR TO WESTINGHOUSE ELECTRIC & MANUFACTURING COMPANY, A CORPORATION OF PENNSYLVANIA

COMBINED TROLLEY-FEEDER CLAMP

Application filed May 11, 1927. Serial No. 190,449.

My invention relates to hangers for trolley conductors and associated cables or feeders and more particularly to hangers adapted to suspend a trolley conductor and a cable or feeder from the same supporting means.

The object of the invention, generally stated, is the provision of a hanger for trolley conductors and feeders that shall be simple and efficient in operation and capable of being readily and economically manufactured.

A more specific object of the invention is to provide a hanger in which the trolley conductor and a supporting cable for the trolley conductor may be mounted and from which they may be removed independently.

It is also an object of the invention to provide a hanger that may be easily and quickly erected or dismantled.

Other objects of the invention will, in part, be obvious and will, in part appear hereinafter.

The invention is disclosed in the embodiment thereof shown in the accompanying drawing, and comprises the structural features and the combination of elements and arrangement of parts which will be exemplified in the construction hereinafter set forth, and the scope of the application of which will be indicated in the appended claims.

For a fuller understanding of the invention, reference may be had to the following detailed description taken in connection with the accompanying drawing, in which.

Figure 1:
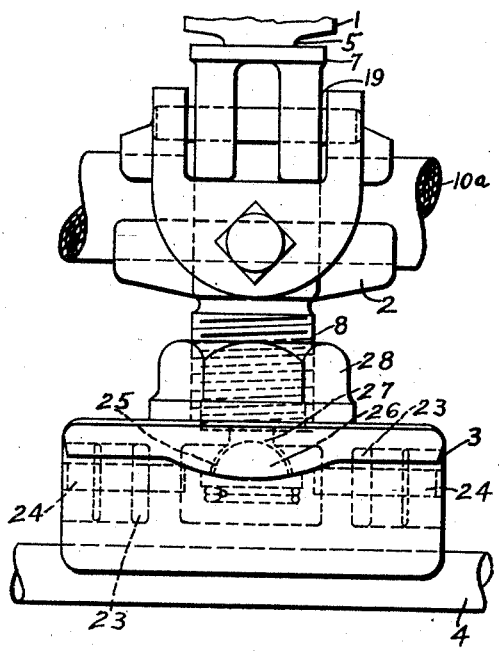
Figure 1 is a view in side elevation of a hanger embodying my invention.
Figure 2:
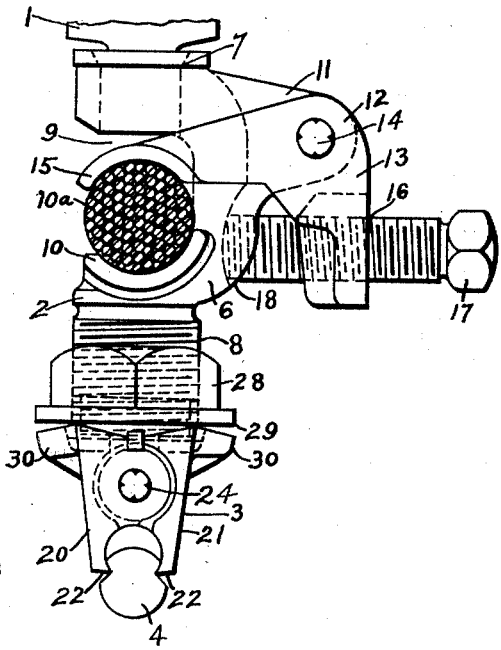
Fig. 2 is a view in end elevation of the hanger illustrated in Fig. 1.
Figure 3:
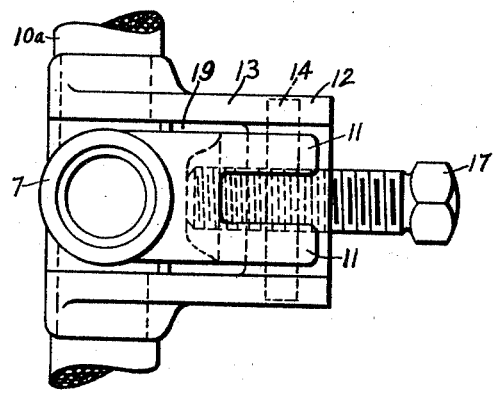
Fig. 3 is a top plan view of the hanger.

In the drawing, I have illustrated a hanger comprising, in general, an overhead supporting member 1, a cable clamp 2, the upper end of which is attached to the overhead support 1, and a trolley conductor clamp 3 that is secured to the lower end of the cable clamp 2 and which is provided to support a trolley conductor 4.

In order to mount the hanger, any well-known type if supporting member, such for example as the expansible bolt 1, only a part of which is shown, may be provided. It will be noted that the depending end 5 of the supporting member is threaded to engage in a threaded opening in the hanger.

The cable clamp 2 comprises a body member 6 provided with a boss 7. In this embodiment of the invention the threaded opening for receiving the depending end or stud 5 of the supporting member is provided in the boss 7. Further, the body member is provided with a depending threaded boss 8 for supporting the trolley conductor clamp 3. A transverse cable receiving channel 9 is provided in the central portion of the body member 6. The lower wall defining the channel 9 is shaped to adapt it for utilization as a seat or jaw 10 to receive a cable or feeder 10a.

On the side of the body member 6, opposite the cable receiving channel 9, hinge members 11 are provided and disposed to extend laterally to form one part of a joint or pivotal connection 12 for mounting a bell crank lever 13. In this case, the bell crank is mounted in the hinge members by means of a pin 14. One end of the bell crank lever 13 is provided with an enlarged grooved or jaw portion 15 that is disposed in alinement with the jaw 10 to provide a clamp for gripping a cable.

In order to actuate the bell crank lever 13 a set-screw 17 is mounted in a threaded aperture 16 provided in its depending arm. As shown the set-screw or screw bolt 17 is disposed in such manner that its inner end extends into a shallow recess 18 in the body member 6. As will be readily understood when the set-screw is actuated the bell crank lever 13 may be rotated about the axis of the pivot or hinge joint 12 and the jaw 15 will be actuated to grip a cable.

Any suitable form of bell-crank lever may be employed but the specific form illustrated in the drawing has a breadth greater than the thickness of the body member 6 and is provided with a large central opening 19 through which the body member 6 may be projected to such a position that the hinge projections 11 are in line with openings provided in the bell crank to permit the insertion of the pin 14 to complete the pivotal connection 12.

While I have illustrated a lever of the bell-crank type provided with a clamping jaw for holding the cable in the cable-receiving channel, it will be understood that any other form of lever or clamping jaw may be employed for clamping the cable in the cable-receiving channel.

The trolley conductor clamp 3 secured to the lower part of the body member 6 may be of any well-known type. I have illustrated a clamp comprising a pair of clamping jaws 20 and 21 provided with lips 22 adapted to grip the trolley conductor 4, and having centrally located complementary recesses 25. As shown, the recesses 25 receive an enlarged head 26 provided on the lower end of a supporting stem 27 which is carried by the body member 6.

The clamping jaws 20 and 21 are provided with two groups of inwardly extending apertured lugs 23 adapting them to be held together in a hinged position on the enlarged head 26 by alined pins 24 disposed in the apertured lugs 23. In order to actuate the jaws 20 and 21 a compression nut 28 is mounted on the lower boss 8 of the body member 6. As illustrated, the nut 28 is provided with an enlarged portion 29 disposed to engage the ribs 30 provided on the upper parts of the clamping jaws 20 and 21. Therefore, by moving the nut 28 downwardly the jaws may be actuated to grip the trolley wire 4.

When it is desired to support a cable by the hanger, the cable is placed in the cable-receiving channel 9 in such position as to rest on the seat 10. It is then clamped in place by operating the stud bolt 17 to move the bell crank lever 13 until its clamping jaw 15 engages the cable and holds it firmly in position in the cable-receiving channel. The cable may be removed from the channel by moving the stud bolt 17 in the opposite direction until the bell crank lever may be moved to such a position that its clamping jaw will release the cable.

When it is desired to insert a trolley conductor in the trolley conductor clamp 3, the compression nut 28 is screwed upward until it will allow the clamping jaws 20 and 21 to be opened to receive a trolley conductor. After the insertion of the trolley conductor, the nut 28 may be screwed downwardly until it causes the clamping jaws 20 and 21 to grip the trolley conductor 4 firmly. The trolley conductor may be removed by simply reversing this operation.

It will thus be observed that a trolley conductor may be mounted in or removed from my improved hanger without disturbing any portion of the hanger except the trolley conductor clamp and also that a cable may be inserted and clamped in or removed from the cable receiving channel of the body member 6 of the hanger without interfering in any way with any other parts of the hanger or with the trolley conductor.

While the illustrated example constitutes a particular embodiment of my invention, I do not limit myself strictly to the details shown, since, manifestly, the same may be considerably varied without departing from the spirit of the invention as defined in the appended claims.

I claim as my invention:

1. The combination with a trolley conductor clamp and a support therefor, of an interposed cable clamp comprising a body member adapted to connect the conductor clamp and the support, the body member having a cable-receiving channel, a bell crank lever mounted on the body member, and a bolt located in one end of the lever and adapted to force the other end of the lever against the cable.

2. A cable clamp comprising a body member having attaching means at each end and provided with a cable-receiving channel intermediate its ends, a bell crank lever pivotally mounted on the body member and a bolt located in one end of the bell-crank lever and disposed to force the other end of the lever against the cable.

3. A cable clamp comprising a body member provided with attaching means at each end and having an open cable-receiving channel in one side, a bell crank lever provided with a clamping jaw and having an opening adapted to receive the body member, means for pivotally securing the lever to the body member, and a bolt associated with one end of the lever for forcing the clamping jaw of the lever against the cable.

4. A cable clamp comprising a body member having attaching means at each end provided with a cable-receiving channel intermediate its ends, a clamp jaw disposed within the cable-receiving channel, a co-operating cable-clamping jaw movably secured to the channel portion of the body member, and means for actuating the clamping jaw, said means comprising a lever member integral with the movable clamping jaw and a set-screw making threaded engagement with the lever member.

5. A cable clamp comprising a body member provided with attaching means at each end and having an open cable-receiving channel in one side, a stationary clamp jaw disposed within the channel, and a movable clamp jaw provided with an actuating lever, disposed to co-operate with the stationary clamp jaw, and a set-screw in threaded engagement with said actuating lever for forcing the movable jaw against the cable.

6. In a conductor-supporting device, in combination, a trolley-conductor clamp, a member for supporting the clamp, said supporting member comprising a stem portion for carrying the trolley-conductor clamp, and an arc-shaped clamp jaw, a bell-crank jaw member disposed to co-operate with the cable jaw, means for actuating the bell-crank jaw member, and means carried by the stem portion for actuating the trolley-conductor clamp.

In testimony whereof, I have hereunto subscribed my name this 29th day of April, 1927.

HOWARD N. RICHARDS.